United States Patent Office 3,632,820
Patented Jan. 4, 1972

3,632,820
PROCESS FOR THE PRODUCTION OF
FLUORINATED BENZODIOXANES
Hans-Ulrich Alles, Leichlingen, and Erich Klauke, Odenthal-Hahnenberg, Germany, assignors to Farbenfabriken Bayer Aktiengesellschaft, Leverkusen, Germany
No Drawing. Filed Nov. 22, 1968, Ser. No. 779,315
Claims priority, application Germany, Dec. 8, 1967,
F 54,267
Int. Cl. C07d 15/08
U.S. Cl. 260—340.3                    10 Claims

ABSTRACT OF THE DISCLOSURE

A process for the production of fluorinated benzodioxanes, wherein a compound of the formula

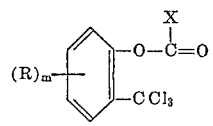

wherein $m$ represents an integer from 1 to 4, R represents the same or different members selected from the group consisting of hydrogen, halogen, optionally substituted aryl, chlorocarbonyl, fluorocarbonyl, trifluoroacetyl, isocyanato, CN, $NO_2$, FCOO, $SO_2F$, ClCOO, $SO_2Cl$ or trihalogenomethyl radicals; or wherein two adjacent radicals R form an optionally substituted anellated benzene ring, and X represents halogen, trifluoromethyl or trichloromethyl, is reacted with anhydrous hydrofluoric acid, and the resultant novel fluorinated benzodioxanes of the formula

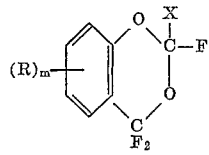

wherein R, $m$ and X are as previously defined.

The compounds of this invention may be employed in the production of plant protection agents and they further have fungicidal properties.

---

This invention relates to a process for the production of hitherto unreported benzodioxanes which are fluorinated in the heterocyclic ring.

It is known that activated trichloromethyl groups, for example in benzotrichloride, can be converted into trifluoromethyl groups by the action of anhydrous hydrofluoric acid. The chlorine in acid chlorides, such as benzoyl chloride, may also readily be replaced by fluorine under the influence of anhydrous hydrofluoric acid. It is also possible in this way to obtain fluoroformic acid phenyl esters, such as fluoroformic acid 3-trifluoromethylphenyl ester and fluoroformic acid 4-trifluoromethylphenyl ester.

The novel fluorinated benzodioxanes are obtained by reacting a compound of the formula

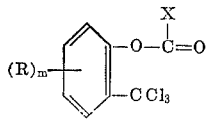

wherein $m$ represents an integer from 1 to 4, R represents the same or different radicals, such as hydrogen or halogen atoms (preferably fluorine, chlorine or bromine), or optionally substituted aryl (preferably phenyl), chlorocarbonyl, fluorcarbonyl, trifluoroacetyl, isocyanato, CN, $NO_2$, FCOO, $SO_2F$, ClCOO, $SO_2Cl$ or trihalogenomethyl (preferably fluorine or chlorine), or wherein two adjacent radicals R form an optionally substituted anellated benzene ring, and X represents halogen (preferably fluorine or chlorine), trifluoromethyl or trichloromethyl, with a two-fold to eight-fold (preferably four-fold to six-fold) stoichiometric excess of anhydrous hydrofluoric acid, optionally in the presence of an inert organic solvent, at a temperature in the range from about $-10$ to $+100°$ C. (preferably from $+10$ to $+70°$ C.).

In one embodiment this reaction is carried out at a temperature of about $-10$ to about $+100°$ C., preferably $+10$ to $+70°$ C. under a pressure of about 2 to about 20, preferably 5 to 15 atmospheres. In still another embodiment the reaction is started at normal pressure and at a temperature of between about $-10$ and $+20°$ C. and continued at about $+20$ to about $+100°$ C. under the same pressure as indicated above.

The compounds which are obtained by the process according to the invention correspond to the general formula

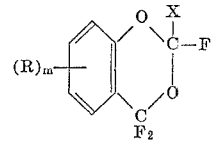

in which X represents fluorine or trihalogenmethyl, $m$ and R have the meaning given above, except that R cannot, in this instance, represent trichloromethyl, chlorocarbonyl, chlorocarbonyloxy or chlorosulphonyl. The following are possible substituents for the anellated benzene ring: nitro-, cyano-, isocyanato-, halogen (preferably fluorine, chlorine or bromine), trifluoromethyl, fluorocarbonyl, trifluoroacetyl, phenyl, fluorocarbonyloxy or fluorosulphonyl.

The starting materials used for the process according to the invention are known or may be obtained by known methods.

One specific mode of carrying out the process of this invention is as follows: The compound to be fluorinated, optionally dissolved in an inert solvent such as methylene chloride, is added dropwise to an excess of anhydrous hydrofluoric acid in a stainless steel autoclave at a temperature of from $-10$ to $+20°$ C. and preferably at a temperature from $-10$ to $+10°$ C. When evolution of hydrogen chloride ceases, the reaction may be completed at a temperature of from about $-20$ to about $100°$ C. under an elevated pressure, and excess hydrofluoric acid is distilled off, optionally together with the solvent, optionally at reduced pressure. The residue is purified by fractionation. In order to obtain a particularly pure product, it may in some instances be of advantage to subject the crude distillate obtained from the residue to steam distillation in an alkaline medium before the fine-fractionation stage. Alkali metal hydroxides and alkali earth metal hydroxides are preferably used as the bases for this purpose.

However, other modes of operation are also possible. For instance the reaction can be carried out under pressure from the start on. Also the compound to be fluorinated may be used as such without a solvent. Other solvents, e.g. chlorinated or fluorinated hydrocarbons may be used, provided they are inert against hydrofluoric acid.

The reaction as described is very unexpected. This is shown by means of the following reaction scheme. The expected reaction would result in product I, actually product II was found.

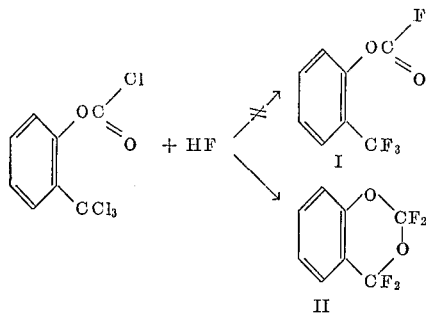

The following are examples of starting compounds suitable for use in the process according to the invention: chloroformic acid 2-trichloromethyl-4-chlorophenyl ester, -5-chlorophenyl ester, -6-chlorophenyl ester, -4,6-dichlorophenyl ester, -4-fluorophenyl ester, -4,6-difluorophenyl-ester, -5-bromophenyl ester, -6-bromophenyl ester, -4-isocyanatophenyl ester, or -4-nitro-5-fluorophenyl ester; chloroformic acid 2,4-bis-trichloromethylphenyl ester; 2,5-trichloromethylphenyl ester, or 2,6-bis-trichloromethyl phenyl ester; chloroformic acid 2-trichloromethyl-5-trifluoromethylphenyl ester, 2-trichloromethyl - 4 - p-nitrophenyl ester, or 2-trichloromethyl - 4 - [3( - trichloromethyl - 4' - chlorocarbonyloxyphenyl]phenyl ester; fluoroformic acid 2 - trichloromethylphenyl ester; 2-trichloromethylphenyl trichloroacetate; and 2-trichloromethylphenyl trifluoroacetate.

Particularly preferred starting compounds include chloroformic acid 4-nitrophenyl ester, 4-isocyanatophenyl ester, 5-fluorocarbonyloxyphenyl ester, and 4-chloro-6-nitrophenyl ester, and 2-trichloromethylphenyl trifluoroacetate.

The novel compounds that can be obtained by the process according to the invention may be used as plastics auxiliaries and may also be employed in the production of plant protection agents. They further have fungicidal properties as exemplified below.

In order to test the fungicidal activity of the products the following procedure was adopted:

FUSICLADIUM TEST

Solvent: Acetone
100 mg. of the active compound were mixed with 5 cc. of the solvent which contained an emulsifier (alkylaryl polyglycol ether). 95 cc. of distilled water were added. This concentrate solution was diluted with water until it had a concentration which was the double of the desired final concentration of the active compound.

Equal parts of this concentrated solution and of an aqueous suspension of spores of Fusicladium dentriticum (causative organism of apple scap) which contained about 200,000 spores per cm. were mixed. 0.05 cc. of this mixture were placed on slides and incubated for 24 hours at a temperature of about 20° C.

The percentage of spores which had germinated was determined and expressed in numbers. Number 0 means that no spores had germinated so that the preparation is fully effective. Number V means that all spores have germinated and that the preparation is completely ineffective in the applied concentration. I to IV are intermediate stages.

Active compound concentrations and results are contained in the following table:

TABLE.—SPORE TEST WITH FUSICLADIUM

| Active compound | Germination [1] |
|---|---|
| 6-nitro-2,2,4,4-tetrafluoro-1,3-benzodioxane. | X |
| 6-nitro-7-chloro-2,2,4,4-tetrafluoro-1,3-benzodioxane. | I |
| 6-chloro-8-nitro-2,2,4,4-tetrafluoro-1,3-benzodioxane. | I |
| 7-difluorochloromethyl-2,2,4,4-tetrafluoro-1,3-benzodioxane. | 0 |

[1] The spores at the following concentrations of active compound in percent 0.0005.

Example 1.—2,2,4,4-tetrafluoro-1,3-benzodioxane (a) A solution of 200 g. of chloroformic acid 2-trichloromethylphenyl ester in 100 ml. of methylene chloride is added dropwise with stirring over a period of 2 hours at 5° C. to 300 ml. of anhydrous hydrofluoric acid in a stainless steel vessel. The temperature is then allowed to rise slowly to 18° C. until the evolution of hydrogen chloride stops. After the hydrofluoric acid and solvent have been distilled off, the reaction mixture is fractionated giving 80.5 g. of distillate boiling at 100° C./80 torr and 57.5 g. of distillate boiling at 130° C./17 torr. A yield of 73 g. of 2,2,4,4-tetrafluoro-1,3-benzo dioxane may be obtained from the lower-boiling fraction by alkaline steam distillation in the presence of 100 ml. of 20% by weight sodium hydroxide, followed by redistillation under normal pressure: this compounds boils at 155° C./760 torr and has a refractive index $n_D^{20}$ of 1.4200.

(b) A solution of 410 g. of chloroformic acid 2-trichloro methylphenyl ester in approximately 100 ml. of methylene chloride is added dropwise with stirring, over a period of 2½ hours at 0 to 5° C. to 600 ml. of anhydrous hydrofluoric acid in a stainless steel autoclave. The temperature is allowed to rise slowly to between 10 and 14° C. until the vigorous evolution of hydrogen chloride has stopped, followed by reaction for another 2 hours at 3 to 4 atms pressure and a temperature from 30 to 50° C. After cooling and depressurization, the excess hydrofluoric acid and solvent are distilled off in vacuo. 2,2,4,4-tetrafluoro-1,3-benzodioxane boiling at 80° C./55 torr is obtained from the residue in a yield of 200 g. by fractionation.

Example 2.—2,2,4,4-tetrafluoro-7-chloro-1,3-benzodioxane 330 g. of chloroformic acid 2-trichloromethyl-5-chlorophenyl ester, in solution in 70 ml. of methylene chloride, are reacted with 400 ml. of anhydrous hydrofluoric acid as in Example 1(b). The fraction distilling at 65 to 70°/C./12 torr contains 130 g. of 2,2,4,4-tetrafluoro-7-chloro-1,3-benzodioxane, with a refractive index $n_D^{20}$ of 1.4492.

Example 3.—2,4,4-trifluoro-2-trifluoromethyl-1,3-benzodioxane

A solution of 148 g. of crude 2-trichloromethylphenyl trifluoroacetate in 150 ml. of methylene chloride is added slowly dropwise at 5 to 10° C. to 150 ml. of anhydrous hydrofluoric acid. The reaction mixture is heated to 18° C. and left to react until the evolution of hydrogen chloride stops. After hydrofluoric acid and solvent have been distilled off, the residue is fractionated under a slight vacuum. 2,4,4-trifluoro - 2 - trifluoromethyl-1,3-benzodioxane boiling at 105° C./100 torr is obtained in a yield of 50 g. The product purified by alkaline steam distillation has a refractive index $n_D^{20}$ of 1.3963.

Example 4.—2,2,4,4-tetrafluoro-6-nitro-1,3-benzodioxane

A solution of approximately 90 g. of chloroformic acid 2-trichloromethyl-4-nitrophenyl ester in 150 ml. of methylene chloride is added dropwise over a period of 1 hour, at 5 to 10° C. to 150 ml. of anhydrous hydrofluoric acid. The mixture is fluorinated under pressure for a period of 6 hours during which the temperature is allowed to rise slowly to 70° C. After cooling, depressurization and concentration in vacuo, 80 g. of a dark crystallizing oil are left behind. The crude product dissolved in methylene chloride, is washed with soda solution and water and, after drying and concentration, gives approximately 60 g. of a dark yellow crystallizing residue. 45 g. of 2,2,4,4-tetrafluoro-6-nitro-1,3-benzodioxane, boiling at 120° C./25 torr and melting at 56° C., are obtained by distillation or recrystallization from petroleum ether.

Example 5.—2,2,4,4-tetrafluoro-1,3-benzodioxane 129 g. of fluoroformic acid 2-trichloromethyl phenyl ester are added dropwise, over a period of 45 minutes at 3 to 11° C., to 100 ml. of anhydrous hydrofluoric acid, The temperature is allowed to rise to 18° C. and the hydrofluoric acid is kept boiling under reflux until hardly any more gaseous hydrogen chloride is given off. After the excess hydrofluoric acid has been distilled off, the residue itself is distilled. 2,2,4,4-tetrafluoro-1,3-benzodioxane, boiling at 90° C./90 torr, is obtained in a yield of 75 g.

Example 6.—2,2,4,4-tetrafluoro-6-chloro-1,3-benzodioxane 285 g. of fluoroformic acid 2-trichloromethyl-4-chloro phenyl ester are quickly added dropwise at 5–10° C. to 300 ml. of anhydrous hydrofluoric acid. The pressure is then increased to 2 atms. of nitrogen, followed by heating to 30° C. The hydrogen chloride gas is continuously let off at 2 atms. pressure. When the evolution of gas subsides, the reaction mixture is fluorinated at 50° C./3.5 atms. pressure until the reaction is over. The reaction product is cooled, the vessel is depressurized and the hydrofluoric acid is distilled off, leaving 173 g. of 2,2,4,4-tetrafluoro-6-chloro-1,3-benzodioxane boiling at 118–120° C./100 torr, refractive index $n_D^{20}$=1.4502.

Example 7.—2,2,4,4-tetrafluoro-6-chloro-1,3-benzodioxane

Crystallized chloroformic acid 2-trichloromethyl-4-chlorophenyl ester rather than the fluoroformic acid-2-trichloromethyl-4-chlorophenyl ester of Example 6 is used as the starting material, and a methylene chloride solution of the ester is initially fluorinated in the absence of pressure at 10 to 80° C. and then after-fluorinated under pressure as described in Example 6. 2,2,4,4-tetrafluoro-6-chloro-1,3-benzodioxane is again obtained in a slightly lower yield.

Example 8.—2,2,4,4-tetrafluoro-7-difluoromonochloromethyl-1,3-benzodioxane

A solution of 280 g. of fluoroformic acid 2,5-bis-trichloromethylphenyl ester in 150 ml. of methylene chloride is added dropwise at 0 to 10° C. to 450 ml. of anhydrous hydrofluoric acid. The reaction mixture is then fluorinated in the absence of pressure at 15 to 18° C. and is then after-fluorinated under pressure at 70° C./6 atms. 7-difluoro monochloromethyl-2,2,4,4-tetrafluoro-1,3-benzodioxane, boiling at 75° C./13 torr with a refractive index $n_D^{20}$ of 1.4250, is obtained in a yield of 154 g. from the crude product from which both hydrofluoric acid and solvent have been removed.

Example 9.—2,2,4,4-tetrafluoro-7-difluoromonochloromethyl-1,3-benzodioxane

Following the procedure set out in Example 8, 7-difluoromonochloromethyl-2,2,4,4-tetrafluoro - 1,3 - benzodioxane is also obtained from chloroformic acid 2,5-bis-trichloromethylphenyl ester, providing a correspondingly larger quantity of hydrofluoric acid is used.

Example 10.—2,2,4,4-tetrafluoro-7-chloro-1,3-benzodioxane

Fluoroformic acid 2-trichloromethyl-5-chlorophenyl ester rather than chloroformic acid-2-trichloromethyl-5-chlorophenyl ester is used as the starting material in a process carried out under the conditions set out in Example 2. 2,2,4,4-tetrafluoro-7,13-benzodioxane is again obtained, but in higher yields, without any need for after-fluorination under pressure.

Example 11.—2,2,4,4-tetrafluoro-7-fluorocarbonyloxy-1,3-benzodioxane

A solution of 40 g. of fluoroformic acid 2-trichloromethyl-5-fluorocarbonyloxyphenyl ester in 40 ml. of methylene chloride is added dropwise, at —5 to 0° C., to 50 ml. of anhydrous hydrofluoric acid. The reaction mixture is fluorinated in the absence of pressure at a temperature of 15° C. until no more hydrogen chloride is given off. After the solvent and the hydrogen fluoride have been distilled off, 2,2,4,4-tetrafluoro-7-fluorocarbonyloxy-1,3-benzodioxane, boiling at 91° C./13 torr., is obtained after rectification. The higher-boiling components may again be used for fluorination.

Example 12.—2,2,4,4-tetrafluoro-6-isocyanato-1,3-benzodioxane

Following Example 10, 2,2,4,4-tetrafluoro-6-isocyanato-1,3-benzodioxane, boiling at 98° C./15 torr and melting at 42/44° C., is obtained from chloroformic acid 2-trichloromethyl-4-isocyanato phenyl ester by fluorination in the absence of pressure, distilling off the solvent and hydrogen fluoride, flushing the crude product with nitrogen at 80° C., and fractional distillation.

Example 13.—2,2,4,4-tetrafluoro-6-chloro-8-nitro-1,3-benzodioxane

Fluoroformic acid 2-trichloromethyl-4-chloro-6-nitrophenyl ester is fluorinated under pressure at a temperature of up to 70° C. in the manner described in Example 4. After the solvent and hydrofluoric acid have been distilled off, the residue is dissolved in methylene chloride, washed with bicarbonate solution and water, and recrystallized from petroleum ether after it has been dried and concentrated. 2,2,4,4 - tetrafluoro - 6-chloro-8-nitro-1,3-benzodioxane, melting at 43/45° C., is obtained.

Example 14.—2,2,4,4-tetrafluoro-6-nitro-7-chloro-1,3-benzodioxane

Following the procedure of Example 12, 2,2,4,4-tetrafluoro-6-nitro-7-chloro-1,3-benzodioxane, melting at 47 to 48° C. (after recrystallization from petroleum ether), is obtained from fluoroformic acid 4-nitro-5-chlorophenyl ester by fluorination under pressure at a temperature of up to 80° C.

Example 15.—2,4,4-trifluoro-2-trifluoromethyl-6-nitro-1,3-benzodioxane

Following the procedure of Example 12, 2,4,4-trifluoro-2-trifluoromethyl-6-nitro-1,3-benzodioxane, melting at 32 to 33° C. (after recrystallization from petroleum ether), is obtained by fluorinating 2-trichloro methyl-4-nitrophenyl trifluoroacetate under pressure at a temperature of up to 50° C.

We claim:

1. A process for the production of fluorinated benzodioxanes, wherein a compound of the formula

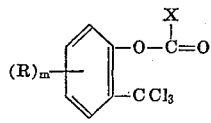

wherein

*m* represents an integer from 1 to 4,

R represents the same or different members selected from the group consisting of hydrogen, halogen, phenyl, chlorocarbonyl, fluorocarbonyl, trifluoroacetyl, isocyanato, CN, NO$_2$, FCOO, SO$_2$F, ClCOO, SO$_2$Cl or trihalogenomethyl and X represents halogen, trifluoromethyl or trichloromethyl, is reacted with a 2-fold to 8-fold stoichiometric excess of anhydrous hydrofluoric acid at a temperature in the range of from about −10° C. to about +100° C.

2. Process according to claim 1 wherein the reaction is carried out in an inert organic solvent.

3. Process according to claim 1 wherein the reaction is carried out under a pressure of from 2 to 20 atmospheres.

4. Process according to claim 1 wherein the reaction is carried out first at a temperature of between −10 and +20° C. at normal pressure until evolution of hydrogen chloride ceases and is then completed at a temperature of between +20 and +100° C. under a pressure of from 2 to 20 atmospheres.

5. A compound of the formula

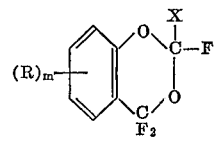

wherein

*m* is an integer of from 1 to 4;

X is fluorine or trihalogenomethyl; and

R is the same or different and is selected from the group of hydrogen, halogen, phenyl, fluorocarbonyl, trifluoroacetyl, isocyanato, CN, NO$_2$, FCOO, SO$_2$F, and trihalogenomethyl other than trichloromethyl.

6. Fluorinated benzodioxane according to claim 5 which is 2,2,4,4-tetrafluoro-1,3-benzodioxane.

7. Fluorinated benzodioxane according to claim 5 which is 2,2,4,4-tetrafluoro-7-chloro-1,3-benzodioxane.

8. Fluorinated benzodioxane according to claim 5 which is 2,2,4,4-trifluoro-2-trifluoromethyl-1-,3-benzodioxane.

9. Fluorinated benzodioxane according to claim 5 which is 2,2,4,4-tetrafluoro-6-nitro-1,3-benzodioxane.

10. Fluorinated benzodioxane according to claim 5 which is 2,2,4,4-tetrafluoro-6-chloro-1,3-benzodioxane.

References Cited

UNITED STATES PATENTS 2,510,036  5/1950  Mowry _____ 260—340.3 X

OTHER REFERENCES

Lee: "Chemical Abstracts," vol. 67, col. 735 63d, p. 4930, 1967.

ALEX MAZEL, Primary Examiner

J. H. TURNIPSEED, Assistant Examiner

U.S. Cl. X.R.

424—278